(12) United States Patent
Harris et al.

(10) Patent No.: US 6,606,885 B2
(45) Date of Patent: Aug. 19, 2003

(54) INFRARED, GLASS POLARIZER AND METHOD

(75) Inventors: Michael D. Harris, Horseheads, NY (US); Thomas G. Havens, Painted Post, NY (US); William E. Horsfall, Corning, NY (US); David J. Kerko, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/974,534

(22) Filed: Oct. 9, 2001

(65) Prior Publication Data

US 2003/0066310 A1 Apr. 10, 2003

(51) Int. Cl.⁷ .................................................. C03C 4/00
(52) U.S. Cl. ........................ 65/30.11; 65/32.3; 65/32.5; 501/13; 359/490; 359/492
(58) Field of Search ................................ 65/30.11, 32.5, 65/30.1, 32.3; 501/13; 359/490, 492

(56) References Cited

U.S. PATENT DOCUMENTS

| | | | |
|---|---|---|---|
| 3,540,793 A | 11/1970 | Araujo et al. ................ 350/147 |
| 4,125,404 A | 11/1978 | Araujo et al. .................. 106/54 |
| 4,190,451 A | * 2/1980 | Hares et al. .................... 501/13 |
| 4,304,584 A | 12/1981 | Borrelli et al. ............ 65/30.11 |
| 4,479,819 A | 10/1984 | Borelli et al. | |
| 4,891,336 A | 1/1990 | Prassas ........................ 501/13 |
| 4,980,318 A | 12/1990 | Araujo ........................ 501/13 |
| 5,007,948 A | 4/1991 | Araujo ........................ 65/30.13 |
| 5,023,209 A | 6/1991 | Grateau et al. ............... 501/13 |
| 5,059,561 A | * 10/1991 | Ciolek et al. .................. 501/13 |
| 5,252,524 A | * 10/1993 | Borrelli et al. ............... 501/56 |
| 5,426,077 A | 6/1995 | Brocheton et al. ............ 501/13 |
| 5,517,356 A | 5/1996 | Araujo et al. ................ 359/490 |
| 5,886,820 A | 3/1999 | Tajima et al. ............... 359/492 |
| 5,932,501 A | 8/1999 | Brocheton .................... 501/64 |
| 6,167,727 B1 | 1/2001 | Tajima et al. ................ 65/30.1 |
| 6,298,691 B1 | 10/2001 | Borrelli et al. ............... 65/30.1 |
| 6,313,947 B1 | 11/2001 | Takahashi et al. .......... 359/492 |

\* cited by examiner

Primary Examiner—James Derrington
(74) Attorney, Agent, or Firm—Timothy M. Schaeberle

(57) ABSTRACT

A glass polarizer and a method of making the polarizer, the polarizer being produced from an $R_2O$—$Al_2O_3$—$B_2O_3$—$SiO_2$ glass containing limited amounts of $ZrO_2$ and $TiO_2$, and having a silver halide liquidus temperature and a rutile liquidus temperature, both temperatures being not over 995° C.

8 Claims, No Drawings

INFRARED, GLASS POLARIZER AND METHOD

BACKGROUND OF THE INVENTION

U.S. Pat. No. 4,479,819 describes the preparation of glass articles exhibiting excellent polarization in the infrared region of the radiation spectrum. These polarizing articles are prepared from glasses containing particles of silver halide dispersed therein. The silver halide is selected from the group consisting of AgCl, AgBr, and AgI.

The method disclosed comprises four basic steps:

(1) a batch for a glass containing silver and at least one halide selected from the group consisting of chloride, bromide and iodide is melted and the melt shaped into a glass body of a desired configuration.

(2) that glass body is subjected to a heat treatment at a temperature at least above the strain point of the glass, but not in excess of 50° C. above the softening point of the glass, for a period of time sufficient to cause the generation of silver halide particles therein, the particles being selected from the group consisting of AgCl, AgBr, and AgI, and ranging in size between about 200–5000 Å; thereafter (3) the glass body is elongated under stress at a temperature above the annealing point of the glass, but below the temperature at which the glass demonstrates a viscosity of about $10^7$ MPa ($10^8$ poises), such that the silver halide particles are elongated to an aspect ratio of at least 5:1 and aligned in the direction of the stress; and then (4) the elongated glass body is exposed to a reducing atmosphere at a temperature above about 250° C., but no higher than about 25° C. above the annealing point of the glass, for a period of time sufficient to develop a reduced surface layer on the glass article having a thickness of at least 10 microns (≈0.0004") and, preferably, about 50 microns (≈0.002"), wherein at least a portion of the elongated silver halide particles is reduced to elemental silver particles having aspect ratios greater than 2:1 and being deposited in and/or upon the elongated particles.

The principal objective of the invention disclosed in that patent is to produce glass articles displaying excellent polarizing properties over the infrared portion of the radiation spectrum, preferably within the region of 700–3000 nm (7000–30,000 Å), but also at longer wavelengths, e.g., 3 to 5 microns.

The dichroic ratio is defined as the ratio existing between the absorption of radiation parallel to the direction of elongation and the absorption of radiation perpendicular to the direction of elongation. The sharper (taller and narrower) the peaks, the higher the dichroic ratio. Sharp peaks occur with the presence of relatively small particles.

Nevertheless, the particles must not be too small. With particles smaller than about 100 Å, the mean-free path limitations to the conduction electrons cause the peak to broaden. Moreover, small particles demand very high elongation stresses to develop the necessary aspect ratio. The likelihood of glass body breakage during a stretching-type elongation process is directly proportional to the surface area of the body under stress. There is, then, a very practical limitation as to the level of stress that can be applied to a glass sheet or other body of significant bulk. In general, a stress level of several MPa (a few thousand psi) has been deemed to comprise a practical limit.

A commercial glass was developed based on the teachings of the -819 patent. However, since initial demand was not large, an available glass, used for ophthalmic lenses, was employed.

That glass required a refractive index of at least 1.523. To achieve that value, substantial amounts of both $ZrO_2$ and $TiO_2$ were incorporated in the glass composition. The glass selected for commercial purposes, was a mixed alkali aluminoborosilicate containing about 5% $ZrO_2$ and about 2% $TiO_2$. The latter was necessary to provide the refractive index required for ophthalmic purposes.

This glass provided excellent properties, but encountered forming problems. These problems arose because there were two different devitrification, that is, crystallization, phases associated with the glass. These phases were a silver halide (AgX) phase and a rutile ($TiO_2$) phase.

These two phases had different liquidus temperatures. Each of these different phases can lead to problems either during the forming process, or during subsequent heat treatments. These problems could be coped with in molding ophthalmic blanks due to the nature of the ophthalmic lens blank molding process. Such blanks are relatively small, can be formed quickly, cooled and mechanically reshaped, if necessary.

The situation is very different in producing polarizers. Here, the glass is cast as bars, or drawn in relatively thick sheets. Bars are cast in a standard thickness. However, in the interest of economy, the width of the bar is as great as possible, while avoiding devitrification. Thus, it would be desirable to form bars up to at least 30.5 cms (one foot) in width.

The AgX phase is influenced by the amount of AgX present in the glass composition. However, for polarization purposes, the AgX content is dictated by the desired polarization behavior. The AgX content may range up to about 0.20 percent by weight, but the AgX liquidus tends to increase accordingly. Thus, the AgX liquidus may range up to 1020° C., but is preferably maintained below 1000° C., that is ≦995° C.

The rutile phase liquidus is the temperature at which rutile ($TiO_2$) crystals start forming. In the present glass, this temperature is greater than 1040° C. This greatly limits the ability to process wide bars and sheets, without encountering crystals forming, that is, without the glass devitrifying. The AgX liquidus temperature is essentially fixed. Therefore, it would be desirable to achieve a rutile phase liquidus temperature near, or preferably somewhat below, the value for the AgX phase, that is ≦995° C.

The ideal condition would be to eliminate the $TiO_2$ content entirely. However, that is not feasible for a couple of reasons. $TiO_2$ is more effective as a refractive index control than $ZrO_2$, while having a minimal effect on photochromic properties, that is particle size. While larger amounts of $ZrO_2$ might be employed, this is undesirable since, as is well known, there is a deleterious effect on the liquidus and the glass becomes difficult to melt.

Further, the 1.523 value of refractive index is not required for a polarizer. Nevertheless, it is desirable to maintain a somewhat lower value, particularly to match an anti-reflection coating, if such coating is applied. Accordingly, a refractive index value of 1.500–1.520 is highly preferred in a polarizing glass.

Perhaps the most important reason stems from the need to switch production back and forth between an ophthalmic glass and a polarizing glass in a single glass melting unit. It was found that the switch to an ophthalmic glass, containing slightly over 2% $TiO_2$, could be made much more rapidly if the $TiO_2$ were not completely removed from the composition for polarizer production. Thus, a considerably longer time was required to obtain stable photochromic properties when the original glass was titania-free. However, with some titania in the original polarizer glass, the properties required in the ophthalmic glass could be stabilized in a much shorter time. Economically, of course, this is highly significant.

It is then a purpose of the present invention to provide an improved glass polarizer of the type disclosed in U.S. Pat. No. 4,479,819.

It is a further purpose to provide a glass polarizer having excellent polarizing characteristics in the infrared portion of the spectrum due to elongated, silver chloride, bromide and/or iodide particles in the glass.

It is another purpose to provide a glass polarizer as disclosed in U.S. Pat. No. 4,479,819, but having AgX and rutile liquidus temperatures not over 1020° C., but preferably about 995° C.

It is a still further purpose to provide a glass polarizer having its polarization characteristics imparted by elongated, silver chloride, bromide and/or iodide particles in the glass, and having a rutile liquidus value not higher than the AgX liquidus value of the glass, and preferably equal to or slightly lower.

The present invention is predicated on modifying an existing, commercial, photochromic glass that was developed and used for ophthalmic purposes. Fortunately, the ophthalmic glass provides the technical properties required for polarization purposes. However, as noted earlier, because of devitrification tendencies, it has proven very difficult to produce wide bars from the glass for a polarizing glass product. The production of such wide bars would, of course, significantly reduce production costs.

It is not uncommon for glasses to have a liquidus temperature at which crystal formation, known as devitrification, is initiated. It then is necessary to develop forming processes that take this problem into account. This has proven very difficult with the present photochromic glass, which has two, high, separated liquidus temperatures.

Polarizers tend to be rather bulky products. They are usually redrawn in the shape of a cylindrical or rectangular bar, but may be in sheet form. In any event, the production of a glass polarizer normally involves a redraw step in which a glass body is reheated, and then elongated in the softened state. This process invites crystal formation if the glass has any tendency for this to occur.

The situation with the present glass is further complicated by the fact that the glass in use has two different liquidus temperatures. One is the AgX liquidus temperature. The other is a rutile liquidus which occurs at temperatures of 1025–1040° C. or higher depending on the glass and the $TiO_2$ content.

As explained earlier, it is difficult to cope with these separated liquidus temperatures. Consequently, it has become necessary to limit the size of the bars produced, thus significantly increasing the cost of an inherently expensive product.

As explained earlier, the AgX context, and consequently, the silver content, may be fixed within rather tight limits. Accordingly, attention was directed to the rutile liquidus. This could, of course, be dealt with by simply omitting $TiO_2$ completely. However, that expedient resulted in a refractive index that was too low for some polarizing product applications. It also created the lengthy switch over time noted above.

Some applications require an anti-reflecting (AR) coating on the glass polarizer. For those applications, a glass is required that has an elevated refractive index, but not one as high as for ophthalmic lenses. Usually, a glass having a refractive index in the range of 1.50–1.52 is suitable for coating purposes.

It has now been found that a glass having a refractive index within the 1.50-1.52 range can be attained by providing a $TiO_2$ content less than 1% by weight in the glass. Of even greater significance is the finding that the rutile liquidus temperature of a glass containing such small amounts of $TiO_2$ does not exceed about 990° C. This lower liquidus temperature may approximate, or be slightly lower than, the AgX liquidus temperature.

This, effectively, creates a single liquidus zone in the area of the unavoidable AgX liquidus, and enables the production of bars up to 30.5 cms (a foot) wide.

Glass constituents, other than AgX, $TiO_2$, and $ZrO_2$ have negligible influence on the liquidus temperatures. Thus, otherwise, the base glass corresponds to that disclosed in the –819 patent. It is a mixed alkali metal oxide aluminoborosilicate glass consisting essentially of 6–20% $R_2O$, wherein the $R_2O$ consists of 0.2–5% $Li_2O$, 0–9% $Na_2O$, 0–17% $K_2O$ and 0–6% $Cs_2O$, 14–23% $B_2O_3$, 5–25% $Al_2O_3$, 0–25% $P_2O_5$, 20–65% $SiO_2$, 0.15–0.3% Ag, 0.004–0.02% CuO, 0.1–0.25% Cl and 0.1–0.2% Br. To provide the desired refractive index, the glass additionally contains 4–6% $ZrO_2$ and $TiO_2$ in an amount less than 1%.

As noted, the base $R_2O$—$Al_2O_3$—$B_2O_3$—$SiO_2$ glass has little effect on polarizing properties. Therefore, to facilitate melting, the present base glass remains essentially unchanged. The principal changes are in the additives, in particular, the silver and the titania ($TiO_2$) contents.

The silver content should be at least 0.160 weight percent, and can range up to 0.20%. However, for most purposes, a silver content of 0.160–0.165% by weight is preferred. As indicated earlier, the glass must contain at least 0.1% $TiO_2$, but this content should be less than 1%. Preferably, the $TiO_2$ content is about 0.4–0.6% by weight.

The preferred glass composition then is:

| | | | |
|---|---|---|---|
| $SiO_2$ | 56.3 | $ZrO_2$ | 4.7–5.0 |
| $B_2O_3$ | 18.2 | $TiO_2$ | 0.1 < 1.0 |
| $Al_2O_3$ | 6.2 | Ag | 0.160–0.165 |
| $Na_2O$ | 5.5 | Cl | 0.220–0.250 |
| $K_2O$ | 5.7 | Br | 0.128–0.150 |
| $Li_2O$ | 1.8 | Cu | 0.0070–0.010 |

Glass compositions effective for present purposes involve only minor, albeit critical, changes from the glasses disclosed in, and developed from, the -819 patent. Therefore, they will be batched, melted and processed in the manner disclosed there, except to the extent indicated above. Accordingly, reference is made to that patent, and it is incorporated herein in its entirety for such information.

Briefly, the glass components will be batched, melted and formed in a body of desired shape in accordance with known practice. The usual halides and oxides, or oxide precursors, will be intimately mixed to provide a homogeneous glass melt. The batch will be melted at about 1300°–1450° and formed in suitable manner. For example, the molten glass may be cast as cylindrical or rectangular bars or drawn as a $^{15}/_{16}$ cm (⅜ inch) thick sheet.

The glass body thus formed will be heat treated at a temperature, and for a time, sufficient to develop the desired silver halide particles in the glass. This may, for example, be at a temperature of 720° C. for a time of a half-hour up to several hours depending on the silver halide particle size desired.

The body thus formed will then be heated to a suitable redraw temperature, for example 550–590° C., and a stress applied to stretch and align the silver halide particles. As explained fully in the -819 patent, the redraw temperature will be limited by the tendency for the elongated silver halide particle to respheriodize. Also, since this requires a relatively stiff glass, the stress applied must be limited to avoid fracture of the glass. Stresses in the range of 1500–4500 psi are generally satisfactory.

Finally, the elongated body is fired in a reducing atmosphere to produce elemental silver particles deposited in or on the silver halide particles. Again, care must be taken to avoid respheroidization of the silver particles. The treatment will be sufficient to develop a reduced surface layer of at least 10 microns, preferably about 50 microns (0.002 inches). Treatment in an atmosphere containing hydrogen at 430° C. for 2–3 hours is generally adequate.

We claim:

1. A glass polarizer that exhibits excellent polarization in the infrared portion of the spectrum, that contains silver halide particles selected from the group consisting of AgCl, AgBr and AgI, the silver halide particles being elongated and aligned to have an aspect ratio greater than 2:1 after reduction to form silver particles deposited in or upon the elongated silver halide particles, the glass consisting essentially of an $R_2O$—$Al_2O_3$—$B_2O_3$—$SiO_2$ glass having a composition consisting essentially of 6–20% $R_2O$, wherein the $R_2O$ consists of 0.2–5% $Li_2O$, 0–9% $Na_2O$, 0–17% $K_2O$ and 0–6% $Cs_2O$, 14–23% $B_2O_3$, 5–25% $Al_2O_3$, 0–25% $P_2O_5$, 20–65% $SiO_2$, 0.15–0.3% Ag, 0.004–0.02% CuO, 0.1–0.25% Cl and 0.1–0.2% Br and containing 4–6% $ZrO_2$, and $TiO_2$ in an amount less than 1% and greater than 0.1%, both by weight, and having both a silver halide and a rutile liquidus temperature, the rutile liquidus temperature being about equal to or below the silver halide liquidus temperature.

2. A glass polarizer in accordance with claim 1 in which the glass additionally contains 0.16–0.20% Ag and 0.4–0.6% $TiO_2$, both by weight.

3. A glass polarizer in accordance with claim 1, the glass having the following approximate composition in parts by weight:

| | | | |
|---|---|---|---|
| $SiO_2$ | 56.3 | $ZrO_2$ | 4.7–5.0 |
| $B_2O_3$ | 18.2 | $TiO_2$ | 0.4–0.6 |
| $Al_2O_3$ | 6.2 | Ag | 0.160–0.165 |
| $Na_2O$ | 5.5 | Cl | 0.220–0.250 |
| $K_2O$ | 5.7 | Br | 0.128–0.150 |
| $Li_2O$ | 1.8 | Cu | 0.0070–0.010 |

4. A method of making a glass polarizer that exhibits excellent polarizing properties in the infrared region of the radiation spectrum, that contains particles of a silver halide selected from the group consisting of AgCl, AgBr and AgI, and that has both a AgX and a rutile liquidus temperature, the rutile liciuidus temperature being about equal to or below the AgX liquidus temperature, the method including melting and forming a body of a mixed alkali metal oxide aluminoborosilicate glass having a composition consisting essentially of 6–20% $R_2O$, wherein the $R_2O$ consists of 0.2–5% $Li_2O$, 0–9% $Na_2O$, 0–17% $K_2O$ and 0–6% $Cs_2O$, 14–23% $B_2O_3$, 5–25% $Al_2O_3$, 0–25% $P_2O_5$, 20–65% $SiO_2$, 0.15–0.3% Ag, 0.004–0.02% CuO, 0.1–0.25% Cl and 0.1–02% Br and containing as refractive index enhancing additives 4–6% $ZrO_2$ and $TiO_2$ in an amount less than 1% and greater than 0.1% by weight.

5. A method in accordance with claim 4 which comprises the further steps of reheating the formed body of glass and elongating the body under stress to elongate the AgX particles to an extent such that they exhibit an aspect ratio of at least 5:1 and are aligned in the direction of the stress.

6. A method in accordance with claim 5 which further comprises the step of exposing the elongated glass article to a reducing atmosphere at a temperature above about 250° C., but no higher than about 25° C. above the annealing point of the glass, for a sufficient length of time to reduce the glass surface to a depth of at least ten microns, thereby reducing at least a portion of the elongated silver halide particles to elemental silver particles having aspect ratios greater than 2:1, the silver particles being deposited in or upon the elongated silver halide particles.

7. The polarizer of claim 1, wherein the polarizer is in the form of a bar or sheet.

8. The polarizer of claim 7, wherein the bar or sheet has a width dimension up to about one foot.

* * * * *